Sept. 18, 1962 T. ONGARO 3,054,275
UNIVERSAL DRIVE SHAFT COUPLING
Filed June 24, 1960 2 Sheets-Sheet 1

INVENTOR.
THEODORE ONGARO
BY Harry B. Keck
ATTORNEY

Sept. 18, 1962 T. ONGARO 3,054,275
UNIVERSAL DRIVE SHAFT COUPLING
Filed June 24, 1960 2 Sheets-Sheet 2
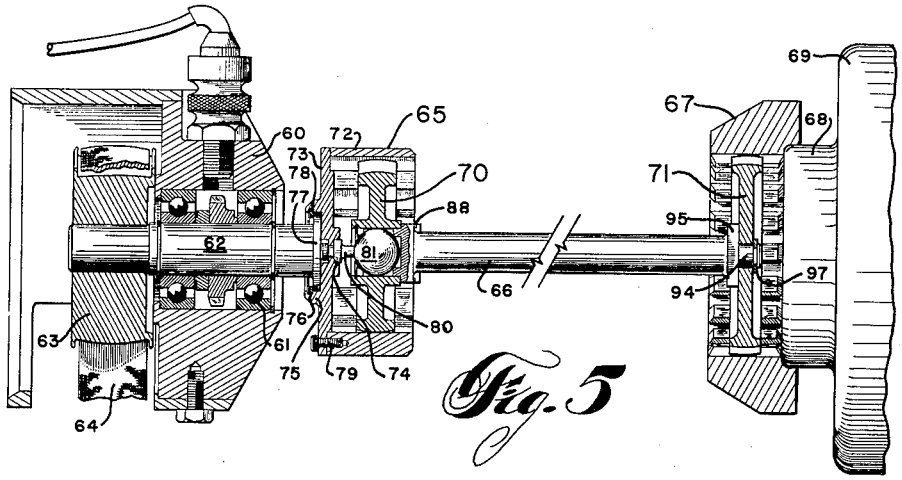
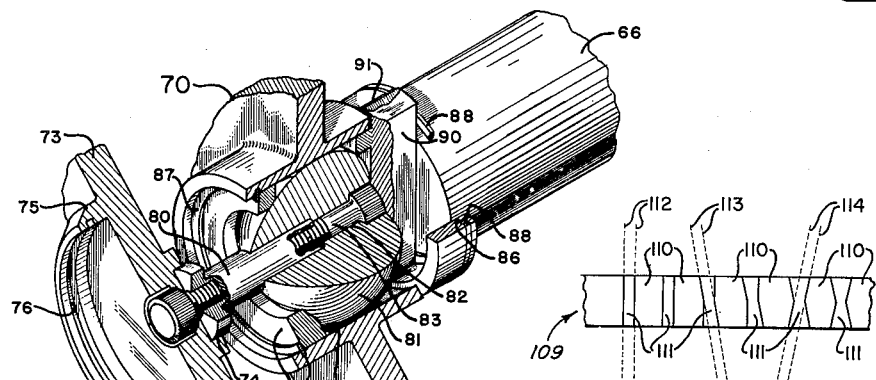
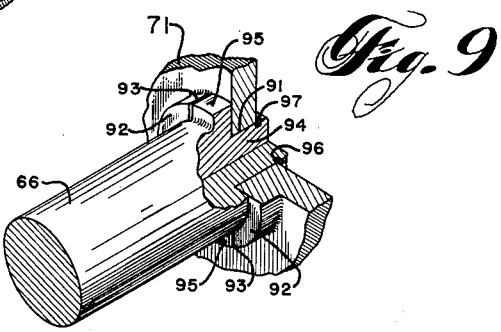
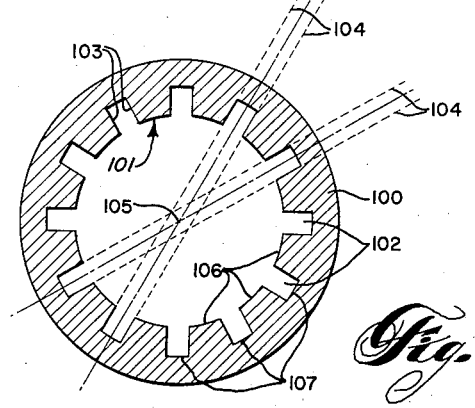
INVENTOR.
THEODORE ONGARO
BY
Harry B. Keck
ATTORNEY United States Patent Office 3,054,275
Patented Sept. 18, 1962

3,054,275
UNIVERSAL DRIVE SHAFT COUPLING
Theodore Ongaro, Columbus, Ohio, assignor to International Research and Development Corporation
Filed June 24, 1960, Ser. No. 38,479
7 Claims. (Cl. 64—9)

The present invention relates to a universal drive coupling for connecting a driveshaft to a driven shaft. More particularly the invention is concerned with a universal drive coupling for connecting a fixed driving shaft with a freely suspended driven shaft which is free to move longitudinally along its axis and laterally with respect to its normal axis position. The present invention has particular utility in dynamic balancing machines wherein rotor elements are tested for imbalance while being rotated in a freely suspended condition.

This application is a continuation-in-part of my copending application Serial Number 840,355 filed September 16, 1959, now abandoned and assigned to the assignee of the present invention.

The principal object of this invention is to provide a low friction universal drive connection.

Another object of this invention is to provide a universal drive coupling which transmits torque from a drive shaft to a driven shaft at the same instantaneous velocity, i.e., one angular degree of movement of the drive shaft creates one angular degree of movement in the driven shaft, regardless of the relative shaft positions.

A further object of this invention is to provide unyielding torque transmission between a driving shaft and a driven shaft over a wide range of relative shaft positions which may include a longitudinal displacement of the driven shaft along its axis.

A further object of this invention is to provide flexible drive connections in a dynamic balancing machine for determining imbalance of rotor elements.

These and other objects and advantages of the present invention will become apparent from the following detailed description by reference to the accompanying drawings in which:

FIGURE 5 is a cross-section illustration of a preferred embodiment of the present universal drive coupling having a fixed drive point;

FIGURE 6 is a fragmentary perspective illustration of the driving shaft connections for the universal drive coupling of FIGURE 5; and FIGURE 7 is a fragmentary perspective illustration showing the connections at the driven shaft end of universal drive coupling of FIGURE 5.

Figure 1:
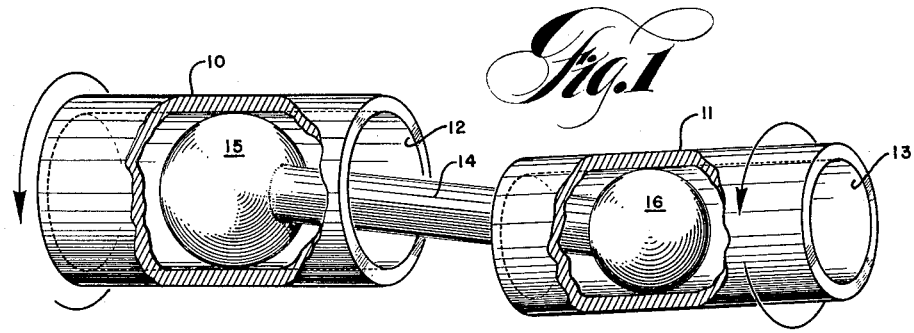
FIGURE 1 is an illustration, partly fragmentary, of a universal connection between two shafts.

Referring to FIGURE 1, two rotatable shafts 10 and 11 are illustrated. The shaft 10 has a cylindrical bore 12; the shaft 11 has a cylindrical bore 13. Connecting the shafts 10 and 11 is a connecting shaft 14 having a sphere 15 at one end and a sphere 16 at the other end. The axis of the connecting shaft 14 passes through the center of each of the spheres 15 and 16. The sphere 15 has an outer diameter corresponding to that of the bore 12. The sphere 16 has an outer diameter corresponding to that of the bore 13.

It should be apparent from inspection of FIGURE 1 that the shaft 11 can be moved in many positions with respect to the shaft 10 while the spheres 15 and 16 are maintained in contact with the bores 12 and 13 respectively.

If the shaft 10 is fixed in position, then regardless of the position of the shaft 11, a circle of surface contact in a single plane will be maintained between the sphere 15 and the bore 12. The circle of surface contact, moreover will always have as its center the center of the sphere 15. Similarly, regardless of the position of the shaft 11, a circle of surface contact will exist between the sphere 16 and the bore 13. The center of that circle of surface contact similarly will at all times be the center of the sphere 16. Note further that the center of the sphere 16 will always lie along the axis of the bore 13. Similarly the center of the sphere 15 will always lie along the axis of the bore 12.

Note that if the shaft 10 is in a fixed position, the movement of the shaft 11 is limited only when the connecting shaft 14 is in contact with inner rim of the bores 12 or 13. Note further that the sphere 16 is free to move longitudinally within the bore 13.

The apparatus of FIGURE 1 illustrates the universality of movement which exists in a sphere-and-cylinder connection. Such a connection, however, has no driving ability because contact exists only along a circle in a single plane where the spheres are in surface contact with the bores.

Figure 2:
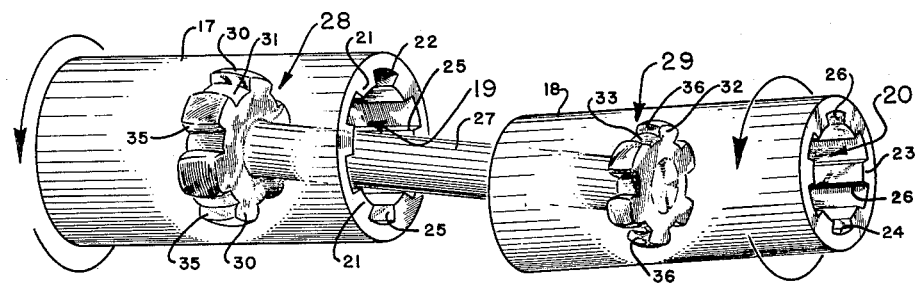
FIGURE 2 is a perspective illustration, partly in phantom, showing the spherical-cylindrical principles of the present universal drive coupling.
Figure 3:
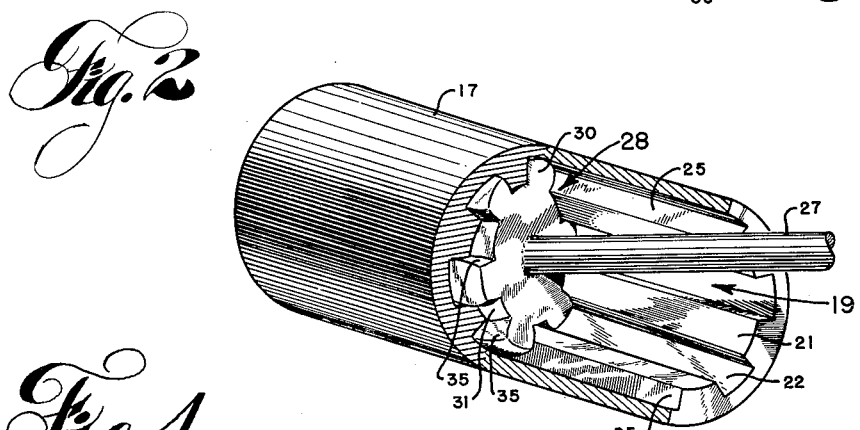
FIGURE 3 is a fragmentary illustration of one-half of the universal coupling of this invention.

I have nevertheless applied the foregoing principles to the construction of a drive coupling as illustrated in FIGURES 2 and 3. As shown in FIGURE 2, a driving shaft 17 and a driven shaft 18 are provided. Each of the shafts 17 and 18 has an internally splined cylindrical bore 19 and 20 respectively. The internally splined bore 19 consists of spline teeth 21 and spline roots 22. The internally splined bore 20 consists of spline teeth 23 and spline roots 24. The inner surfaces of the spline teeth 21 and 23 are cylindrical surfaces having as their axis, the axis of the bores 19 and 20 respectively. The inner surfaces of the spline roots 22 and 24 similarly are cylindrical surfaces having as their axis the axis of the bores 19 and 20 respectively. The sides 25 and 26 of each of the spline teeth 21 and 23 respectively are parallel flat surfaces formed by parallel planes which lie on parallel secants extending across the bores 19, 20 equidistant from the axis of the bores 19, 20.

Joining the shafts 17 and 18 is a connecting shaft 27 having spherical gears 28 and 29 at its ends. The spherical gear 28 has spherical teeth 30 and spherical roots 31. The spherical gear 29 has spherical teeth 32 and spherical roots 33.

The outer surfaces of the spherical teeth 30 correspond to the outer surface of a sphere having its center on the axis of the connecting shaft 27 and having a radius corresponding to the radius of the spline roots 22. The outer surfaces of the gear roots 31 correspond to the outer surface of a sphere having its center on the axis of the connecting shaft 27 and having a radius corresponding to the radius of the spline teeth 21. Each of the gear teeth 30 has side walls 35 which are tapered to allow angular movement of the gear teeth 30 within the spline roots 22. The gear 29 similarly has tapered side walls 36 along the sides of its gear teeth 32.

It should be noted that the tapered side walls 35 and 36 result in a generally hour-glass shape in the gear roots 31 and 33 respectively. If the side walls 35 and 36 were, instead, flat surfaces, the gears 28, 29 would not be movable within the splined bores 19, 20.

It will be apparent that the relationship between the gear roots 31 and the spline teeth 21 is a sphere-and-cylinder relation as already described in connection with FIGURE 1. It will further be apparent that the relationship between the gear teeth 30 and the spline roots 22 is a sphere-and-cylinder relationship as already described in connection with FIGURE 1. Provision of the tapered side walls 35 allows the angular movement of the gear 28 within the bore 19. However at all times, the surface contact between the gear teeth 30 and the spline roots 22 occurs along a circle in a single plane having its center on the axis of the bore 19 and being perpendicular to the axis of the bore 19. Similarly the contact between the gear roots 31 and the spline teeth 21 occurs at all times along a circle in a single plane having its center on the axis of the bore 19 and being at all times perpendicular to the axis of the bore 19. Thus, regardless of the angular position of the connecting shaft 27, driving motion is transferred from the driving shaft 17 to the spherical gear 28 through contact points in a single plane which is transverse to the axis of the bore 19.

Corresponding relationships exist in the spherical gear 29 with respect to the driven shaft 18.

Figure 4:
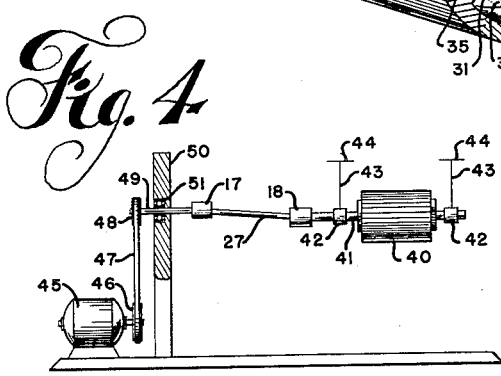
FIGURE 4 is an illustration of the present universal coupling as a driving means for a dynamic balancing machine in which imbalance of rotor elements can be determined.

A schematic illustration of the applicability of the present universal drive coupling is presented in FIGURE 4. In the balancing of rotors under dynamic conditions, frequently it is desired to suspend a rotor in a freely oscillatable condition in which it can be rotated at various speeds. Any imbalance existing in such a rotor can be determined and measured from its observed oscillation. Such a rotor 40, undergoing dynamic balance testing, is mounted on its shaft 41 in bearings 42 which are suspended by means of flexible wires 43 secured to a rigid support 44. A rigidly mounted drive motor 45 turns, through driving connections such as a pulley 46, a belt 47 and a pulley 48, a balancing drive shaft 49. The balancing drive shaft 49 extends through a rigid support 50 and is held in position by means of a bearing 51. Secured to one end of the drive shaft 49 is an internally splined drive connection 17 of the type illustrated in FIGURES 2 and 3. Secured to the shaft 41 of the rotor 40 is an internally splined connection 18 of the type illustrated in FIGURE 2. A connecting shaft 27 of the type illustrated in FIGURE 2 extends between the internally splined connectors 17 and 18.

With the drive connections illustrated in FIGURE 4, it is unnecessary that the test rotor 40 be accurately aligned with the balancing driveshaft 49. Moreover the rotor 40 is free to exhibit any oscillations resulting from its own imbalance without experiencing any oscillatory forces resulting from the driving connections. The test rotor 40 is free to move not only in an oscillating manner but also longitudinally with respect to its axis by virtue of the longitudinal freedom of movement which is inherent in the present drive coupling.

In a preferred embodiment of the present invention, one of the spherical gears is positioned within an internally splined socket in such manner that it is free to pivot about a fixed point on the axis of the internally splined socket but is not free to move in a longitudinal direction. The preferred embodiment will now be described by reference to FIGURES 5, 6, and 7.

A rigid housing 60 is provided in which a bearing 61 supports an input drive shaft 62. A drive pulley 63, driven from a motive source (not shown) through a belt 64, is operative to rotate the input drive shaft 62. A universal drive coupling according to this invention includes an internally splined socket 65 secured to the driving end of the input drive shaft 62, a connecting shaft 66, and a second internally splined socket 67 secured to a rotatable driven shaft 68 of a rotor 69. A spherical gear as previously described is connected to each end of the connecting shaft 66. At one end, a spherical gear 70 is securely held within the internally splined socket 65 to allow pivotal movement about a fixed point on the axis of the internally splined socket 65. At the other end, a spherical gear 71 is longitudinally slidable within the internally splined socket 67.

The internally splined socket 65 includes a cylinder 72 and a circular base plate 73. An axial aperture 74 is provided at the center of the circular base plate 73. An annular slotted lip 75 having an internal peripheral groove 76 surrounds the aperture 74 on the exposed surface of the circular base plate 73. The annular slotted lip 75 is slotted to receive a transverse bar 77 from the input drive shaft 62. A tension ring 78 fits into the internal peripheral groove 76 to secure the circular base plate 73 with the input drive shaft 62. The circular base plate 73 may be secured to the cylinder 72 by means of screws 79 or other suitable fastening means. An internally threaded pin 80 extends through the axial aperture 74. A sphere 81 having a diametrical bore 82 receives the pin 80. A screw 83 enters the diametrical bore 82 from the opposite end and is threadedly engaged into the pin 80. In this manner, a spherical surface, formed by the sphere 81 is secured within the cylinder 72. The center of the sphere 81 is fixed on the axis of the cylinder 72.

The hub of the spherical gear 70 has a circular bore 84 having a diameter corresponding to the diameter of the sphere 81. The bore 84 has an internal radial groove 85 and an external radial groove 86 adapted to receive tension rings 87 and 88. A circular metal washer 89 is held in position within the bore 84 by contact with the outer surface of the sphere 81 on one side and by means of the tension ring 87 on the other side. The central opening in the washer 89 has lesser diameter than that of the sphere 81. Thus the entire spherical gear 70 can be rotated through a variety of angular positions about the sphere 81. The points of contact of the teeth of the gear and the roots of the gear 70 with the internal splines of the cylinder 72, as heretofore stated, form concentric, coplanar circles having as their center the geometric center of the sphere 81. The concentric, coplanar circles are at all times in a plane perpendicular to the axis of the cylinder 72.

The connecting shaft 66 has an integral radially extending bar 90. A diametrical slot 91 is provided in the hub of the gear 70 to receive the bar 90. The tension ring 88 engages the external radial groove 86 to secure the bar 90 within the diametrical slot 91 whereby the hub of the gear 70 is secured in relation to the connecting shaft 66.

As thus described, the connecting shaft 66 is free to pivot about the center of the sphere 81 but is secured against longitudinal movement along its axis with respect to the internally splined socket 65.

The driven shaft connection will now be described by reference to FIGURES 5 and 7.

The hub of the spherical gear 71 has a circular bore 91 with an annular lip 92 having a diametrical slot 93. The extreme end of the connecting shaft 66 has a reduced diameter end portion 94 having a diameter corresponding to that of the bore 91. A radially extending bar 95 is provided on the connecting shaft 66 to engage the diametrical slot 93. A groove 96 is provided at the extreme end of the reduced diameter end portion 94 to receive a tension ring 97 which secures the hub of the gear 71 to the connecting shaft 66.

The spherical gear 71 is not longitudinally confined within the internally splined socket 67. The only points of contact of the spherical gear 71 with the internally splined socket 67 occur along concentric, coplanar circles in a plane which is at all times perpendicular to the longitudinal axis of the socket 67. The center of the contact circles occurs along the axis of the socket 67.

Thus the rotatable element 69, when freely suspended, is free to move longitudinally with respect to its own axis and also is free to oscillate while being driven unyieldingly at a velocity determined by the input drive-shaft 62. That is, one angular degree of rotation of the drive shaft 62 results in one angular degree of rotation in the driven shaft 68.

It is apparent from the foregoing description that the actual driving force exerted by the present universal drive coupling (referring to FIGURE 2) is transferred from the gear side surfaces 35 to the internal spline side surfaces 25. The function of the spherical surfaces of the gear teeth 30 and gear roots 31 is to maintain the gear 28 in a position where its center (and hence the axis of the connecting shaft 27) is at all times and in all positions maintained along the longitudinal axis of the bore 19. This purpose can be accomplished by providing a spherical surface only to the gear teeth 30, provided that the diameter of the gear roots 31 is less than the inner diameter of the spline teeth 21. Alternatively, the result can be achieved by providing a spherical surface only on the gear roots 31 provided that the outer diameter of the gear teeth 30 is less than the diameter of the spline roots 22. For optimum results, however, I prefer the construction previously described wherein both the gear teeth 30 and the gear roots 31 possess a spherical surface corresponding to the cylindrical surfaces of the spline roots 22 and the spline teeth 21 respectively.

Referring to FIGURE 8, the construction of the internally splined sockets (e.g., 65, 67) will be described. A cylindrical socket 100, shown in cross-section, is drilled to provide an axial bore 101. Thereafter individual slots 102 are cut longitudinally of the bore 101. Each of the slots 102 has parallel flat sides 103 which are formed from parallel secant planes which are equidistant from the axis of the bore 101. The secant planes are indicated in FIGURE 8 by the broken lines 104. It will be seen that the broken lines 104 are parallel secants of the circle having the center 105 at the axis of the bore 101 and further that the broken lines 104 are equidistant from the center 105.

The spline teeth 106 retain the cylindrical surface of the bore 101. The spline roots 107 likewise are provided with a cylindrical surface about the longitudinal axis of the bore 101.

The tapered side walls of each gear tooth on the spherical gears are clearly illustrated in FIGURE 9 which is a projected gear development illustration. The spherical gear 109 has spherical outer tooth surfaces 110 and root surfaces 111. The gear roots are formed by cutting slots in the spherical gear blank firstly parallel to the axis of the gear as indicated by the broken lines 112 and thereafter obliquely to the gear axis as indicated by the broken lines 113 and 114. The resultant root surfaces as seen at the right side of FIGURE 9 present an hour-glass projection over the root spherical surface.

I have found that if the spherical gear 109 is provided with slots only as indicated by the broken lines 112, the gear root surfaces 111 will be rectangular, not of an hour-glass configuration; such gears are longitudinally slidable within a splined socket of the type shown in FIGURE 8 but are not pivoted within the socket.

According to the provisions of the patent statutes, I have explained the principle, preferred embodiment and mode of operation of my invention and have illustrated and described what I now consider to represent its best embodiment. However, I desire to have it understood that, within the scope of the appended claims, the invention may be practiced otherwise than as specifically illustrated and described.

I claim:
1. A universal drive coupling for connecting a driving shaft and a driven shaft including an internally splined cylindrical driving socket at the end of the driving shaft, an internally splined cylindrical driven socket at the end of the driven shaft, a connecting shaft having at one end a driving gear of outer spherical configuration and at the other end a driven gear of outer spherical configuration, said driving gear being in meshing relation with said driving socket and being pivotal only about a single fixed point on the axis of said driving socket which point is the center of the spherical driving gear, said driven gear being in meshing relation with said driven socket and being pivotal about its own center which at all times lies upon some point on the axis of said driven socket, each of said gears being in peripheral contact with their respective sockets only along points lying in a single plane which is perpendicular to the axis of the respective socket.

2. The universal drive coupling of claim 1 wherein said internally splined sockets have splines formed from parallel planes which cut secants across the bore of said sockets and which define spline teeth and roots of cylindrical surface having as their arc center the axis of said sockets.

3. The universal drive coupling of claim 2 wherein the driving and driven gears have tapered gear teeth and hour-glass gear roots of spherical configuration.

4. The universal drive shaft coupling of claim 1 including in the said internally splined cylindrical driving socket:
   a spherical ball mounted with its center fixed at a point on the axis of the said driving socket,
   the said driving gear having in its hub an axial bore of diameter corresponding to that of said ball,
   securing means at each end of the said axial bore for maintaining said driving gear in pivotal relation about the said ball whereby the center of the said driving gear coincides at all times with the center of said ball.

5. The universal drive coupling of claim 4 wherein a pin is secured along the axis of the said driving socket and the said spherical ball is rigidly secured to the said pin.

6. A driving connection for a universal drive coupling including an internally splined cylindrical socket at the end of a driving shaft, a spherical ball mounted within said socket having its center fixed at a point on the axis of said socket, a gear of outer spherical configuration being in meshing relation with said socket, said gear having in its hub an axial bore of diameter corresponding to that of said ball, securing means at each end of said axial bore to maintain said gear in pivotal relation about said ball whereby the center of the said gear coincides at all times with the center of said ball, and means associated with the hub of said gear for securing to said gear a connecting shaft extending outwardly from said socket and having an axis colinear with the axis of said axial bore, said gear being in peripheral contact with the said socket only along points lying in a single plane through the center of said ball which plane is perpendicular to the axis of the said socket.

7. A universal coupling for driving a freely suspended rotor having a driven shaft at constant velocity from a constant velocity driving shaft substantially aligned with the shaft of said rotor including an internally splined driving socket at the end of said driving shaft and an internally splined driven socket at the end of said driven shaft, a connecting shaft having a gear of outer spherical configuration at each end thereof, one said gear being in meshing relation with the splines of said driving socket and the other said gear being in meshing relation with the splines of said driven socket, one of said gears being pivotal only about a single fixed point on the axis of its respective socket which coincides with the center of said gear, the other of said gears being pivotal about its own center point which at all times lies along the axis of its respective socket, each of said gears being in peripheral contact with their respective sockets only along points lying in a single plane which is perpendicular to the axis of the respecive socket.

References Cited in the file of this patent
UNITED STATES PATENTS

| | | |
|---|---|---|
| 1,282,598 | Lamb | Oct. 22, 1918 |
| 1,335,913 | Orbom | Apr. 6, 1920 |
| 1,362,652 | Tucker | Dec. 21, 1920 |
| 2,114,807 | McCavitt | Apr. 19, 1938 |
| 2,841,966 | Belden et al. | July 8, 1958 |
| 2,922,294 | Wildhaber | Jan. 26, 1960 |